UNITED STATES PATENT OFFICE.

ROBERT C. HARTONG, OF AKRON, OHIO, ASSIGNOR TO THE GOODYEAR TIRE & RUBBER COMPANY, OF AKRON, OHIO, A CORPORATION OF OHIO.

COMPOUNDING OF RUBBER COMPOUNDS.

1,396,837. Specification of Letters Patent. Patented Nov. 15, 1921.

No Drawing. Application filed October 25, 1918. Serial No. 259,690.

*To all whom it may concern:*

Be it known that I, ROBERT C. HARTONG, a citizen of the United States, residing at Akron, in the county of Summit and State of Ohio, have invented a new and useful Improvement in Compounding of Rubber Compounds, of which the following is a specification.

The present invention relates to the art of producing rubber products and more particularly to the procedure to be followed in actually making the mixtures.

As described in my earlier application, filed March 30, 1917, as Patent No. 1,301,693, I have discovered that a considerable improvement in the quality of rubber compounds may in some cases be effected by the addition thereto of gel-forming proteids, such as animal glue, the best results being obtained by incorporating such proteids into the rubber while in the form of a gel.

The present invention relates specifically to a further development of the procedure described in this earlier application. According to the present invention the process of compounding or mixing the rubber composition is divided into two stages, as follows:

The glue is brought into solution or into the form of an emulsion, paste or gel by the use of water, and to this solution, paste or gel there is added any finely divided solid or powder constituent which it is desired to have introduced into and disseminated through the rubber. The thorough intermixture of the finely divided ingredient with the glue gel may be effected with great ease owing to the more or less fluid condition of the latter and the mixture may then be incorporated into the rubber on the mixing mill, for example, where, owing to the presence of the carrier liquid the thorough dissemination and dispersion of the ingredients of the mixture through the mass of the rubber is effected with a minimum amount of mechanical manipulation.

As described in my prior application, the completed mixture may then be subjected to the action of a vacuum drier to remove the water prior to the vulcanization of the rubber.

As an example of the process according to the present invention, the following may be given:

50 pounds of glue (dry weight) is gelled with 80 pounds of water and to this gel there is now added 5 pounds of pine-oil. To this glue gel, emulsified with pine-oil as described, there is added with proper stirring 100 pounds of gas-black, which operation may be easily conducted in a closed mixer, thus avoiding the objectionable dusting of the dry black. When the gas black, together with any other pigment or filler, which it is desired to introduce into the rubber, has been doughed or thoroughly mixed into the glue emulsion, the latter is incorporated with the rubber on a mixing mill. During the process of mixing on the mill, the water content of the gel in part evaporates, which would tend to produce lumpiness and hardening of the glue, thereby making the mixing process more difficult. The pine-oil constituent of the gel here exhibits its value in maintaining the glue in a soft and semi-fluid condition throughout the mixing process.

For pine-oil there may be substituted asphaltic oils, turpentine, glycerin, and, in fact, any substance which will prevent or retard the drying out and hardening of the glue, and which in the small proportions called for by the present process will have no injurious effect upon the rubber, even though it is permitted to remain therein as in the case of the non-volatile oils mentioned, that is, oils less volatile than the aqueous constituent of the gel.

It is to be understood that the foregoing example is illustrative only and that the invention is not limited to the exact procedure, proportions or materials mentioned therein, except in so far as the limitations may be included within the terms of the accompanying claims in which it is my intention to claim all novelty inherent in the invention as broadly as is permissible in view of the prior art.

What I claim is:

1. In the production of rubber containing proteids and finely divided ingredients, the mixing method which consists in preparing a dispersion of the proteid, containing an emulsifying agent capable of retarding the removal of the dispersion vehicle, mixing the finely divided solid therewith and then incorporating the whole into the rubber.

2. In the production of rubber containing an added gel-forming proteid, the method which consists in forming an emulsion of such proteid with water and a substance which will retard the driving out of the water and incorporating the emulsion into the rubber.

3. In the manufacture of rubber products, the method which consists in forming an emulsion of a gel-forming proteid, water and oil, and incorporating the said emulsion into the rubber.

4. In the manufacture of rubber products, the method which consists in forming an emulsion of a gel-forming proteid, water and oil, incorporating the said emulsion into the rubber, and driving the water out of the rubber mix.

5. In the manufacture of rubber products, the method which consists in first forming an emulsion of water, a gel-forming proteid, oil and gas-black, and incorporating the same into the rubber.

6. In the manufacture of rubber products, the method which consists in first forming an emulsion of water, a gel-forming proteid, oil and gas-black, incorporating the same into the rubber and evaporating out the moisture from the mixed product before vulcanization thereof.

7. The method of mixing rubber products, which consists in emulsifying glue with water and a small proportion of pine-oil, adding gas-black to the emulsion, and incorporating the whole with the rubber.

8. In the manufacture of rubber products, the method which consists in first forming an emulsion of water, a gel-forming proteid, oil, and admixing a finely divided solid therewith, and then incorporating the whole into rubber.

9. In the production of rubber containing an added gel-forming proteid, the method which consists in forming an emulsion of such proteid with water and a substance less volatile than water, which will retard the driving out of the water and incorporating the said emulsion into the rubber.

10. In the production of rubber containing glue, the method which consists in forming an emulsion of glue with water and a substance which will retard the driving out of the water, and incorporating the emulsion into the rubber.

11. In the manufacture of rubber products, the method which consists in forming an emulsion of glue, water and oil, and incorporating the said emulsion into the rubber.

12. In the manufacture of rubber products, the method which consists in first forming an emulsion of water, glue and oil, admixing a finely divided solid therewith, and then incorporating the whole into rubber.

ROBERT C. HARTONG.